(12) United States Patent
Krikorian et al.

(10) Patent No.: US 11,025,452 B2
(45) Date of Patent: Jun. 1, 2021

(54) EDGE SERVER AND METHOD OF OPERATING AN EDGE SERVER

(71) Applicant: HUAWEI TECHNOLOGIES CO., LTD., Shenzhen (CN)

(72) Inventors: Karabet Krikorian, Düsseldorf (DE); Jijun Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 16/171,328

(22) Filed: Oct. 25, 2018

(65) Prior Publication Data

US 2019/0068400 A1    Feb. 28, 2019

Related U.S. Application Data

(63) Continuation of application No. PCT/EP2016/059183, filed on Apr. 25, 2016.

(51) Int. Cl.
*H04L 12/46* (2006.01)
*H04L 29/08* (2006.01)
*H04L 12/66* (2006.01)

(52) U.S. Cl.
CPC ............. *H04L 12/46* (2013.01); *H04L 12/66* (2013.01); *H04L 67/10* (2013.01); *H04L 67/12* (2013.01);
(Continued)

(58) Field of Classification Search
CPC ..... H04L 12/46; H04L 12/66; H04L 67/2819; H04L 67/125; H04L 67/12; H04L 67/10
See application file for complete search history.

(56) References Cited

U.S. PATENT DOCUMENTS 8,774,076 B2 * 7/2014 Ou .................... H04L 12/185
370/312
2005/0147104 A1 * 7/2005 Ould-Brahim ...... H04L 12/4608
370/395.5
(Continued)

FOREIGN PATENT DOCUMENTS

CN    104618506 A    5/2015
EP     1696376 A2    8/2006

OTHER PUBLICATIONS

Huawei, "Edge Server for Industry 4.0 and IoT Cloud based Concept", on Oct. 12, 2015, total 19 pages.

*Primary Examiner* — Min Jung
(74) *Attorney, Agent, or Firm* — Kilpatrick Townsend & Stockton LLP

(57) ABSTRACT

The invention relates to an edge server (140a) for being arranged at the edge between a first local area network (110a) and a wide area network (180), wherein the edge server (140a) comprises: a communicator (141a) configured to allow communication between the devices (111a, 113a) connected to the first local area network (110a) and devices (111b) connected to the wide area network (180), wherein the communicator (141a) is further configured to store and process data provided by the first local area network (110a) using big data algorithms locally; and an interlinker (143a) configured to allow communication between the devices (111a, 113a) connected to the first local area network (110a) and devices (111b) connected to a second local area network (110b) supported by another edge server (140b), wherein the other edge server (140b) is arranged at the edge between the second local area network (110b) and the wide area network (180).

14 Claims, 9 Drawing Sheets

(52) U.S. Cl.
CPC ........ *H04L 67/125* (2013.01); *H04L 67/2819* (2013.01)

(56) References Cited

U.S. PATENT DOCUMENTS

| | | |
|---|---|---|
| 2013/0227672 A1 | 8/2013 | Ogg et al. |
| 2015/0286933 A1* | 10/2015 | Trivelpiece ............ G06N 5/027 706/47 |
| 2015/0327052 A1 | 11/2015 | Ghai |
| 2016/0050279 A1 | 2/2016 | Pahng |
| 2017/0163422 A1* | 6/2017 | Chatterjee ............... H04L 65/80 |
| 2017/0180214 A1* | 6/2017 | Azevedo ............... H04L 41/147 |
| 2017/0187642 A1* | 6/2017 | Nolan ..................... H04W 4/70 |
| 2017/0237623 A1* | 8/2017 | Hopkins ................ H04W 4/70 709/223 |
| 2017/0302756 A1* | 10/2017 | Chou ....................... H04L 12/66 |
| 2019/0369984 A1* | 12/2019 | Malladi ............... H04L 12/2823 |
| 2019/0387062 A1* | 12/2019 | Enat ..................... H04L 67/148 |

\* cited by examiner

EDGE SERVER AND METHOD OF OPERATING AN EDGE SERVER

CROSS-REFERENCE TO RELATED APPLICATIONS

This application is a continuation of International Application No. PCT/EP2016/059183, filed on Apr. 25, 2016, the disclosure of which is hereby incorporated by reference in its entirety.

TECHNICAL FIELD

Generally, the present invention relates to communication networks. More specifically, the present invention relates to an edge server and a method of operating an edge server, in particular in an industrial environment.

BACKGROUND

The rapidly increasing digitization of economy and society is one of the main driving forces behind recent attempts to combine manufacturing and production methods with information and communication technology. In the tradition of the steam engine, the production line, electronics and IT, smart factories are representing the fourth industrial revolution, also referred to as "Industry 4.0". Just as everyday objects such as mobile phones, cameras, cars, etc. are becoming "smart" and are being networked into the global Internet (i.e. the Cloud), a similar development can also be witnessed inside of factories. Following the paradigm of the Internet of Things (IoT), all the components that make up a production system of a factory, such as robots, machines and sensors, are becoming smart network nodes that can be easily—and largely autonomously—integrated into IP-based networks.

However, today's industry and IoT players to-date have no existing solution for the technical problems they are facing for communicating, managing and bridging different protocols and IoT traffic streams in an "Industry 4.0" environment on a real-time basis with the required degree of local autonomy that will is required. Moreover, to-date IoT networks require a lot of time to configure, re-configure and maintain, often manually.

SUMMARY

According to a first aspect the invention relates to an edge server for being arranged at the edge between a first local area network and a wide area network. The edge server comprises a communicator configured to allow communication, i.e. provide communication channels, between the network devices of the first local area network and the network devices of the wide area network, wherein the communicator is further configured to store and process data provided by the network devices of the first local area network using big data algorithms locally. Moreover, the edge server comprises an interlinker configured to allow communication between the network devices of the first local area network and the network devices of a second local area network supported by another edge server, wherein the other edge server is arranged at the edge between the second local area network and the wide area network.

The edge server according to the first aspect provides a unified gatekeeper of services, such as data traffic, policies and security, which can communicate, for instance, with one or more gateways in the associated local area network and with applications or services provided, for instance, by application servers in the wide area network, thereby reducing the complexity of communication networks.

In a first possible implementation form of the edge server according to the first aspect as such, the communicator is further configured to forward request information to a cloud-based gateway.

In a second possible implementation form of the edge server according to the first implementation form of the first aspect, the communicator is configured to forward request information to the cloud-based gateway on the basis of an Advanced Message Queuing Protocol (AMQP) and/or Message Queuing Telemetry Transport (MQTT) protocol.

In a third possible implementation form of the edge server according to the first aspect as such or the first or second implementation form thereof, the interlinker is configured to allow secure communication between the first local area network and the second local area network.

In a fourth possible implementation form of the edge server according to the first aspect as such or any one of the first to third implementation form thereof, the edge server further comprises a network functions virtualizer configured to provide virtualized network functions to the first local area network.

In a fifth possible implementation form of the edge server according to the fourth implementation form of the first aspect, the network functions virtualizer is configured to provide virtualized network functions in response to the triggering of a "one-click" service creation function provided by a graphical user interface.

In a sixth possible implementation form of the edge server according to the first aspect as such or any one of the first to fifth implementation form thereof, the edge server further comprises a software defined networking (SDN) controller configured to provide SDN functions to the first local area network.

In a seventh possible implementation form of the edge server according to the sixth implementation form of the first aspect, the SDN controller is configured to manage at least one gateway of the first local area network.

In an eighth possible implementation form of the edge server according to the seventh implementation form of the first aspect, the SDN controller is configured to manage the at least one gateway of the first local area network in case the at least one gateway cannot be controlled by a SDN controller of the wide area network.

In a ninth possible implementation form of the edge server according to the first aspect as such or any one of the first to eighth implementation form thereof, the edge server is configured to communicate with the first local area network via a gateway.

In a tenth possible implementation form of the edge server according to the ninth implementation form of the first aspect, the gateway is an OPC-UA (open platform communications-unified architecture) compliant gateway.

In an eleventh possible implementation form of the edge server according to the first aspect as such or any one of the first to tenth implementation form thereof, the edge server is configured to provide a graphical user interface for allowing a user to interact with the edge server.

According to a second aspect the invention relates to a method of operating an edge server at the edge between a first local area network and a wide area network, wherein the method comprises: allowing communication between the network devices of the first local area network and the network devices of the wide area network, including storing and processing data provided by the network devices of the first local area network using big data algorithms by the edge server; and allowing communication between the network devices of the first local area network and the network devices of a second local area network supported by another edge server, wherein the other edge server is arranged at the edge between the second local area network and the wide area network.

The method according to the second aspect of the invention can be performed by the edge server according to the first aspect of the invention. Further features of the method according to the second aspect of the invention result directly from the functionality of the edge server according to the first aspect of the invention and its different implementation forms.

According to a third aspect the invention relates to a computer program comprising program code for performing the method according to the second aspect of the invention when executed on a computer.

According to a fourth aspect the invention relates to a network comprising the local area network, the wide area network and the edge server according to the first aspect of the invention.

The invention can be implemented in hardware and/or software.

BRIEF DESCRIPTION OF THE DRAWINGS

Further embodiments of the invention will be described with respect to the following figures, in which.

In the figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It will be appreciated that the invention may be placed in other aspects and that structural or logical changes may be made without departing from the scope of the invention. The following detailed description, therefore, is not to be taken in a limiting sense, as the scope of the invention is defined by the appended claims.

For instance, it will be appreciated that a disclosure in connection with a described method will generally also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims, embodiments with functional blocks or processing units are described, which are connected with each other or exchange signals. It will be appreciated that the invention also covers embodiments which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
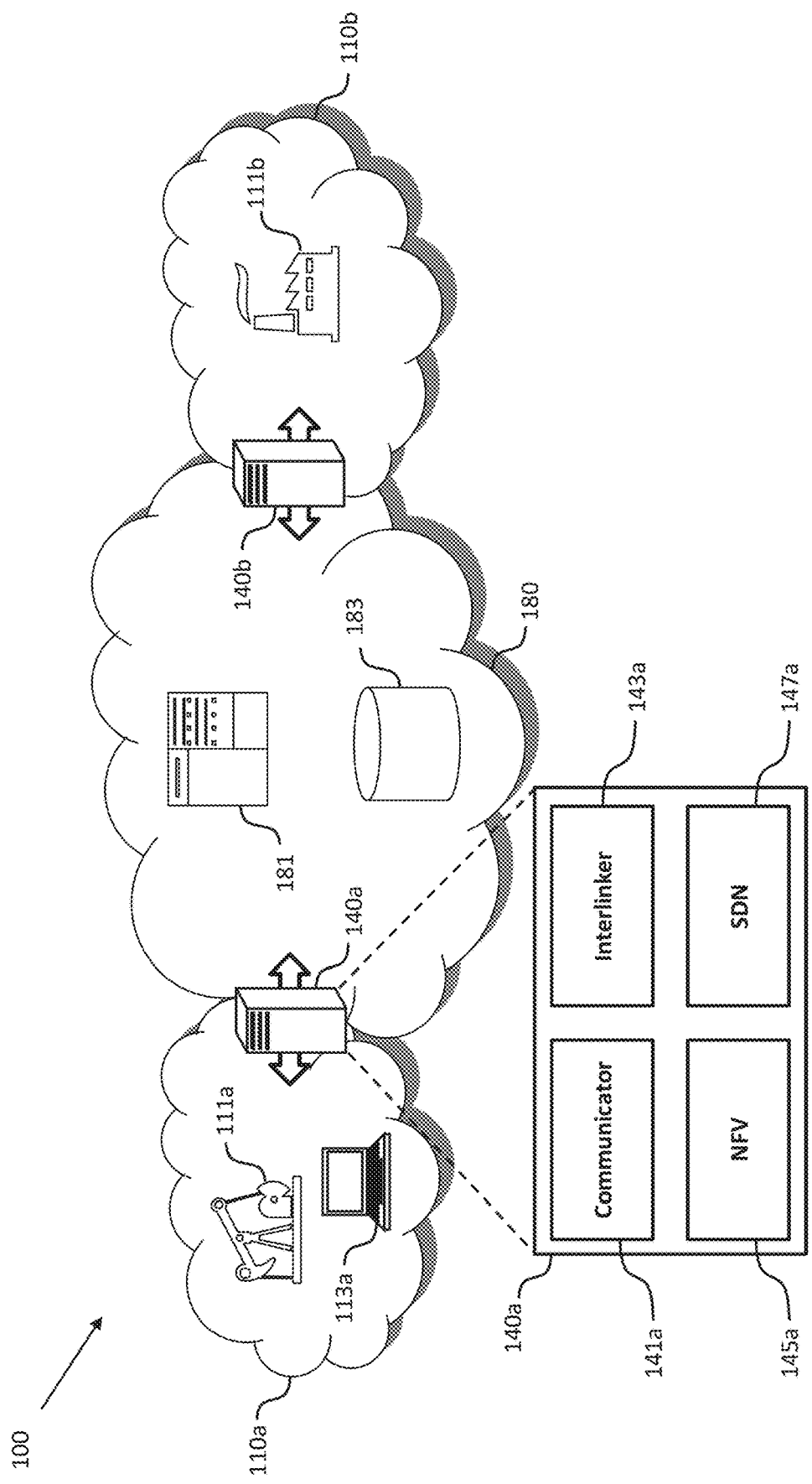
FIG. 1 shows a schematic diagram illustrating a communication network including an edge server according to an embodiment.

FIG. 1 shows a schematic diagram of a communication network 100 according to an embodiment. The communication network 100 comprises a first local area network 110a, a second local area network 110b and a wide area network 180. Both the first local area network 110a and the second local area network 110b can comprise a plurality of network devices (also referred to as smart devices) and can be configured as wired and/or wireless LANs. In the embodiment shown in FIG. 1 the first local area network 110a comprises by way of example a smart machine 111a and a laptop computer 113a and the second local area network 110b comprises a smart manufacturing site 111b. In an embodiment, the smart machine 111a and/or the smart manufacturing site 111c can, in turn, comprise a plurality of smart actors and/or smart sensors, which for the sake of clarity are not shown in FIG. 1 (but, for instance, in FIGS. 2, 5 and 7).

In an embodiment, the wide area network 180 can be the Internet or a cloud, such as a private cloud, a public cloud or a hybrid cloud. The wide area network (also referred to as backend system) 180 can comprise a plurality of different network devices, such as data centers, server farms, application servers, files servers, databases and the like. In the embodiment shown in FIG. 1 the wide area network 180 comprises, by way of example, an application server 181 and a data center 183.

Moreover, the communication network 100 comprises at the interface between the first local area network 110a and the wide area network 180 as well as at the interface between the second local area network 110b and the wide area network 180 a respective network entity in the form of an edge server, namely the edge servers 140a and 140b, respectively. Physically, the edge server 140a can be part of the first local area network 110a or the wide area network 180 and the edge server 140b can be part of the second local area network 110b or the wide area network 180.

In the following the edge server 140a, which is essentially identical to the edge server 140b and, thus, can be considered as a representative of a plurality of edge servers within the communication network 100, will be described in more detail. As can be taken from the enlarged view shown in FIG. 1, the edge server 140a comprises a communicator 141a and an interlinker 143a. In the embodiment shown in FIG. 1 the edge server 140a further comprises a NF virtualizer 145a and a SDN controller 147a.

The communicator 141a of the edge server 140a is configured to provide unified communications between network devices in the wide area network 180, such as the application server 181, which, in an embodiment, can provide, for instance, applications for big data analysis and predictive maintenance, and network devices being part of the first local area network 110a, such as the smart machine 111a or the laptop computer 113a. The communicator 141a acts as a secure medium for industry and IoT gateways. In an embodiment, the communicator 141 of the edge server 140a is capable of performing at least some level of big data analysis and/or predictive maintenance functions locally. As the edge server 140a is located at the edge of the wide area network 180, implementing some local big data analysis and predictive maintenance functionality in the communicator 141 is advantageous, in particular, for real time or security applications. Thus, the communicator 141a is further configured to store and process data provided by the network devices 111a, 113a of the first local area network 110a using big data algorithms locally.

The interlinker 143a of the edge server 140a is configured to interlink the first local area network 110a, for instance, with the second local area network 110b. To this end, in an embodiment, the interlinker 143a is configured to interact with a corresponding interlinker of the edge server 140b associated with the second local area network 110b. In an embodiment, the interlinker 143a of the edge server 140a (possibly together with the corresponding interlinker of the edge sever 140b) can provide secure real-time communications between the first local area network 110a and the second local area network 110b and the respective devices associated therewith.

Figure 2:
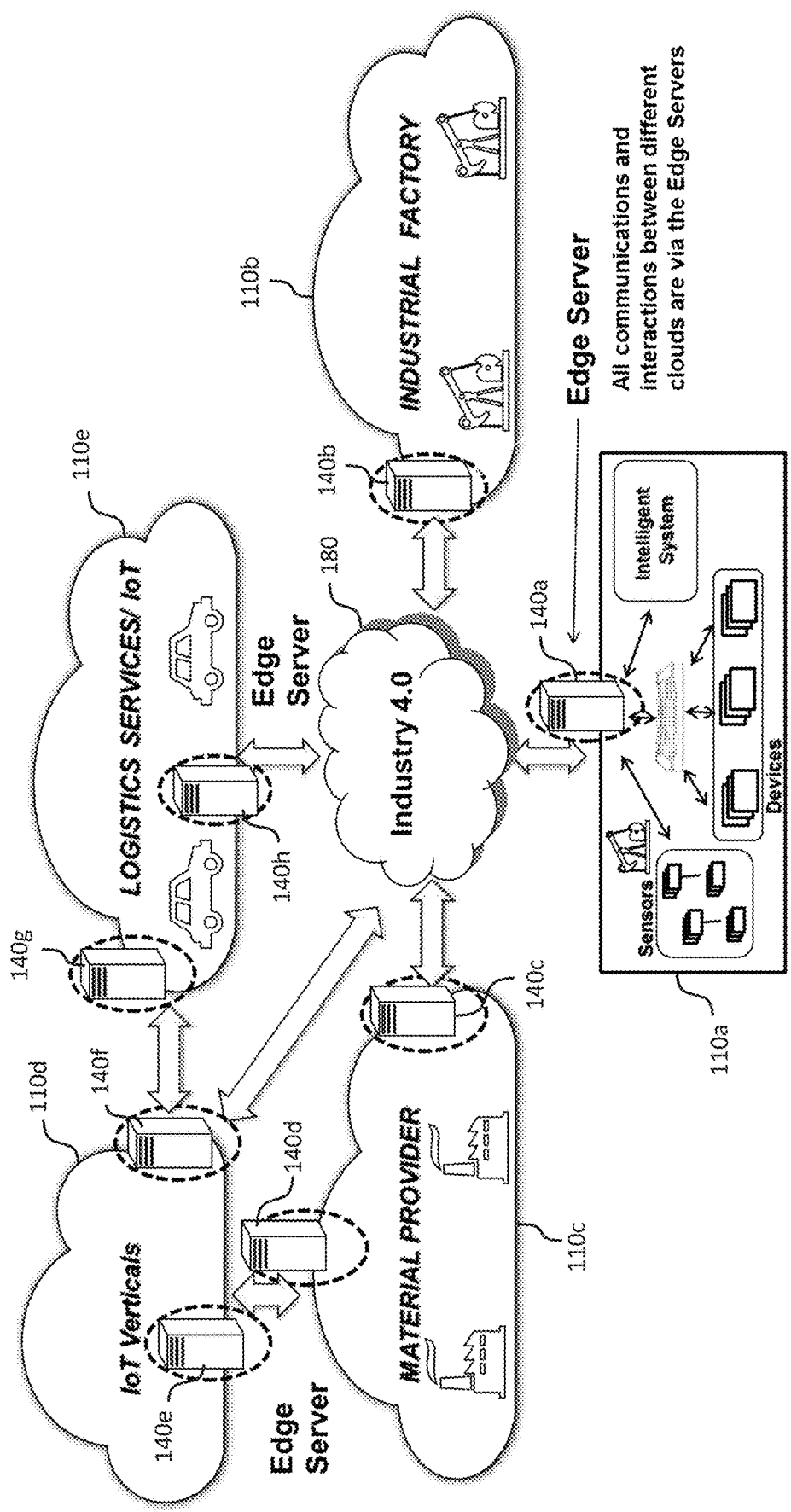
FIG. 2 shows a schematic diagram illustrating different aspects of a communication network and an edge server according to an embodiment within an interlinking environment.

FIG. 2 illustrates the interlinking capabilities of a plurality of edge servers 140a-h according to an embodiment, wherein the plurality of edge servers 140a-h are associated with different local area networks 110a-e. In the exemplary scenario shown in FIG. 2, these different local area networks 110a-e are associated with such entities as a material provider, IoT verticals, logistic services and/or an industrial factory. Thus, the edge server 140a and its interlinker 143a can address the problem that many companies involved in a particular value chain today, such as materials providers, logistics providers, are not fully integrated and interlinked with each other or with manufacturing companies. Moreover, the edge server 140a and its interlinker 143a can meet the strong demand for automated solutions to federate cloud network resources and processes, and to derive the integrated management cloud layer that enables an efficient and secure deployment of resources and services independent of their location across distributed infrastructures. For instance, the edge server 140a and its interlinker 143a make it possible to specify a customized product to be manufactured in specific quantities to participants within a Federated Industry Cloud in order to obtain the most suitable and best quotation. In an embodiment, such a Federated Industry Cloud implemented with the help of the plurality of edge servers 140a-h can provide for the following advantages: a single point of interconnection for all industry players, neutral service brokering and clearing, Federal Service aggregation and management, multitenant identity and access management, secure data exposure and exchange and/or centralized SLA (service-level-agreement) and Policy control.

As already mentioned above, in the embodiment shown in FIG. 1, the edge server 140a further comprises a network functions virtualizer (NFV) 145a. In an embodiment, the NF virtualizer 145a is configured to provide virtual network functions, for instance, a virtual machine, in the first local area network 110a. In an embodiment, the NF virtualizer 145a is configured to provide any virtual network functions in response to the triggering of a "one-click" service creation function provided by a user interface of the edge server 140a, which will be described in more detail further below in the context of FIG. 6. The advantage of a "one click" service creation function is the possibility of providing a fast Time-to-Market deployment desired by industry and IoT verticals.

Moreover, in the embodiment shown in FIG. 1, the edge server 140a further comprises a SDN (software-defined networking) controller 147a. In an embodiment, the SDN controller 147a can be implemented to be controlled by a centralized SDN controller that is located in the wide area network 180. In other words, in an embodiment, the SDN controller 147a can act as a slave towards the centralized SDN controller located in the backend system. In an embodiment, however, the SDN controller 147a of the edge server 140a can be configured to take over the SDN control of the first local area network 110a and the devices thereof. For instance, in case the centralized SDN controller located in the backend system 180 cannot reach, for instance, one or more gateways in the first local area network 110a, the SDN controller 147a of the edge server 140a is configured to take over and control the gateways that are mapped to the edge server 140a. In turn, the centralized SDN controller located in the backend system 180 can extract traffic configuration files from the edge server 140a and can update them accordingly.

In the following, further implementation forms, embodiments and aspects of the edge server 140a as well as the communication network 100 and its components will be described.

Figure 3:
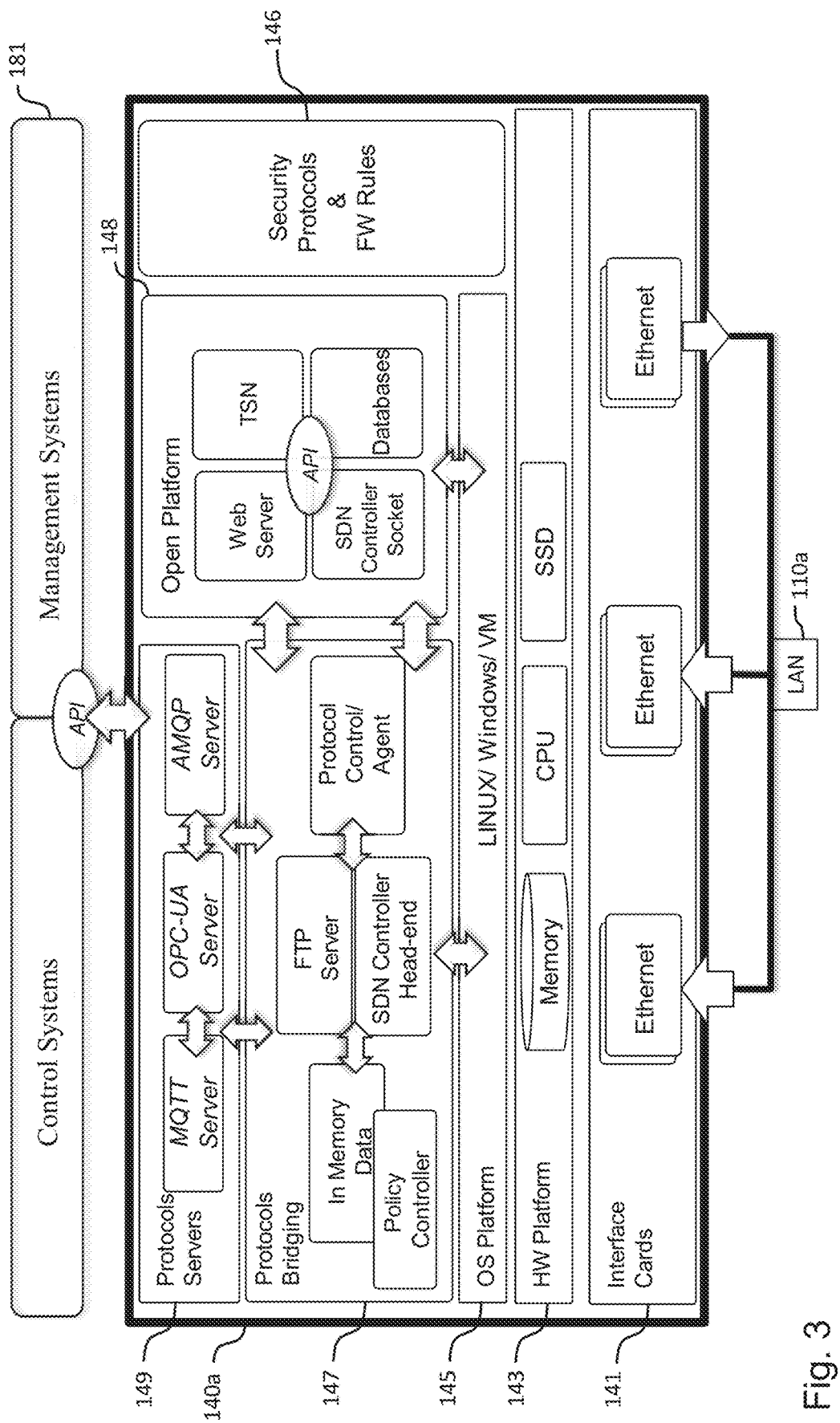
FIG. 3 shows a schematic diagram illustrating the hardware and software architecture of an edge server according to an embodiment.

FIG. 3 shows a diagram illustrating the hardware and software architecture of the edge server according to a possible embodiment. As already described above, the edge server 140a is configured to communicate in the northbound direction with applications and/or services, such as the control systems and management systems shown in FIG. 3, which can be provided by an application server 181 of the wide area network 180. In an embodiment, the application server 181 can provide applications such as predictive maintenance, lifecycle management, event management, remote inspection and the like. In an embodiment, this northbound communication can be based on an application programming interface (API) implemented on, for instance, the application server 181. For both the communication in the northbound as well as in the southbound direction, i.e. with the network devices of the first local area network 110a, the edge server 140 can comprise a plurality of suitable interface cards 141, for instance, Ethernet cards.

The edge server 140a shown in FIG. 3 comprises a hardware platform 143, including a CPU, a memory and a data storage in form of a solid state drive. The hardware platform 143 is configured to execute an operating system 145, such as Linux, Windows or a virtual machine. In the embodiment shown in FIG. 3 the following module are implemented on top of the operating system platform 145: a protocols bridging module 147, a protocols servers module 149 and an open platform module 148. In parallel thereto, a module 146 for security protocols and forwarding rules is implemented on top of the hardware platform 143. In the embodiment shown in FIG. 3 the protocols bridging module 147 comprises a policy controller, an FTP server, a controller head-end, a protocol control/agent and an in memory data submodule. In the embodiment shown in FIG. 3 the protocols servers module 149 comprises a MQTT (message queue telemetry transport) server, an OPC-UA (open platform communications-unified architecture) server and an AMQP (advanced message queuing protocol) server. In the embodiment shown in FIG. 3 the open platform module 148 comprises a web server, a TSN (time-sensitive networking) submodule, a SDN controller socket as well as databases.

Figure 4:
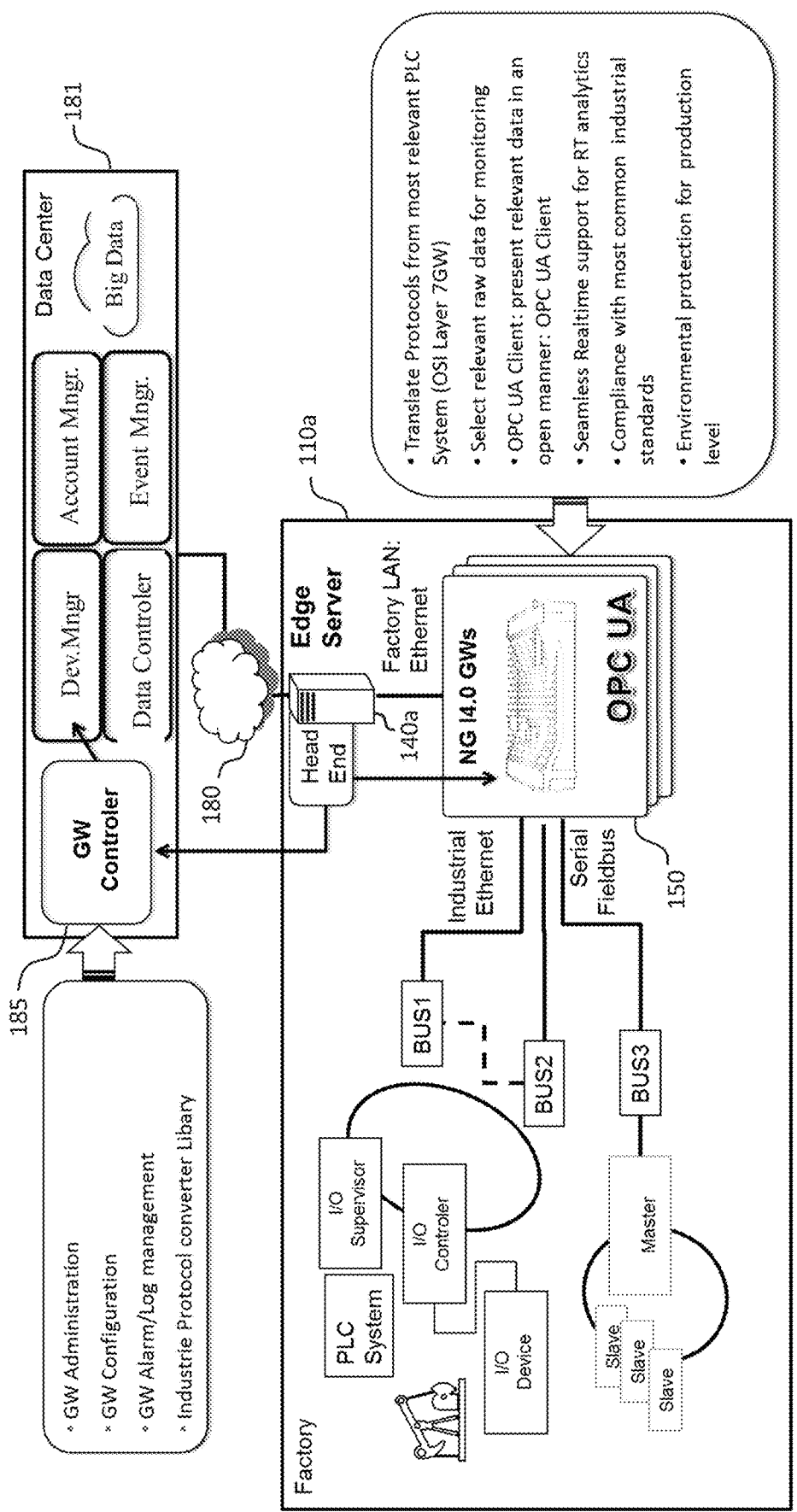
FIG. 4 shows a schematic diagram illustrating different aspects of a communication network and an edge server according to an embodiment.
Figure 5:
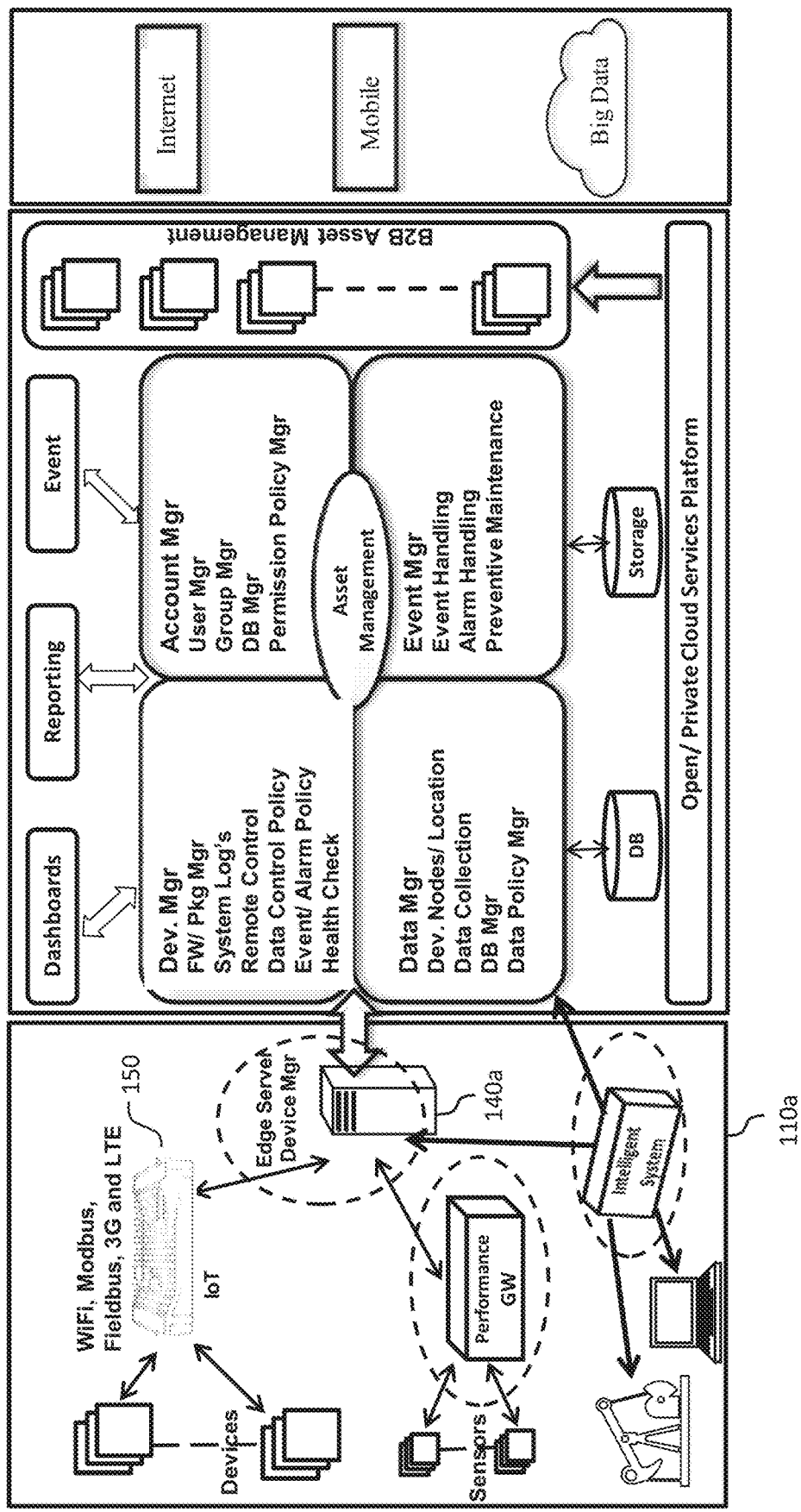
FIG. 5 shows a schematic diagram illustrating different aspects of a communication network and an edge server according to an embodiment.

In an embodiment, the edge server 140a is configured to communicate with the network devices of the first local area network 110a via a bridge or gateway. In the embodiment shown in FIG. 4 the edge server 140a is configured to communication the network devices of the first local area network 110a via an OPC-UA (open platform communications-unified architecture) gateway 150, which can be implemented in hardware and/or software. In an embodiment, the gateway 150 is configured to communication with the network devices of the first local area network 110a by means of different bus systems, such as Profibus, Profinet, Fieldbus, Modbus, DeviceNet, Ethernet/IP or the like. A similar embodiment is shown in FIG. 5.

Applying OPC-UA can integrate the I/O products of third-party devices/sensors of the first local area network 110a via the gateway 150 and the edge server 140a to import the data to appropriate entities located in the backend system 180, such as industrial monitoring systems, databases for backend management, interoperability and security services of the industrial and IoT systems.

In an embodiment, the gateway 150 can act as an client/agent towards one or more agents, and can forward request information to a cloud-based gateway 185 using Advanced Message Queuing Protocol (AMQP)/Message Queuing Telemetry Transport (MQTT) protocols. Using MQTT/AMQP communication can bridge the system with the IoT to meet the current industrial and IoT market requirements.

Communication from the cloud back to the network devices of the first local area network 110a can be safely transported using messages stored in the gateway 150. This broker model provides a communication channel that is as secure as any Virtual Private Network (VPN) but without the existing complexity of today networks. Using industrial protocols from the device to the cloud provides a reliable and secure platform for industrial applications based on openness and unified open application programming interface (API).

Figure 6:
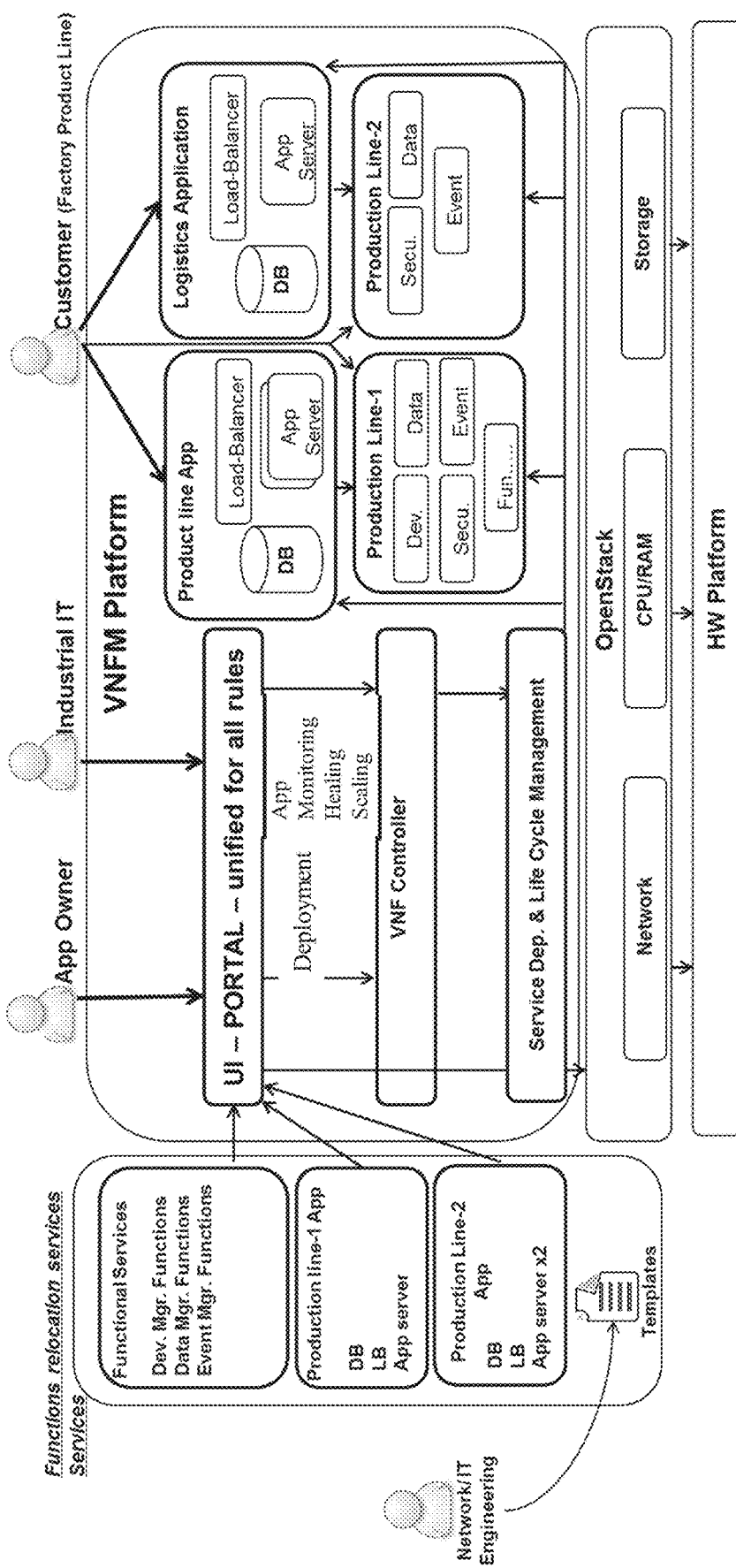
FIG. 6 shows a schematic diagram illustrating different aspects of a communication network and an edge server according to an embodiment.

As already described above, in an embodiment the edge server 140a can comprise a NF virtualizer 145a and/or a SDN controller 147a. In an embodiment, the NF virtualizer 145a is configured to interact with a "One-Click" service creation function, which could be implemented in the backend system 180. The "One-Click" service creation function is configured to create batches of virtual network functional elements and mapping them back to appropriate application servers of the backend system 180. In an embodiment, the edge server 140a can comprise an embedded NFV/SDN controller socket that is configured to communicate with a centralized "One-Click" service creation server of the backend system 180. In an embodiment, the edge server 140a is configured to be controlled by the centralized "One-Click" service creation server located in the backend system 180. In an embodiment, the centralized "One-Click" service creation server can update the security rules and/or policies for the network devices, such as smart sensors or smart machines, of the first local area network 110a associated with the edge server 140a and provide a mapping for the desired cloud based applications, such as predictive maintenance applications and services, as is illustrated in FIG. 6. In an embodiment, the edge server 140a can be configured to provide a graphical web interface to support users to configure and define the rules and policies for individual or sets of devices of the first local area network 110a associated with the edge server 140a.

Figure 7:
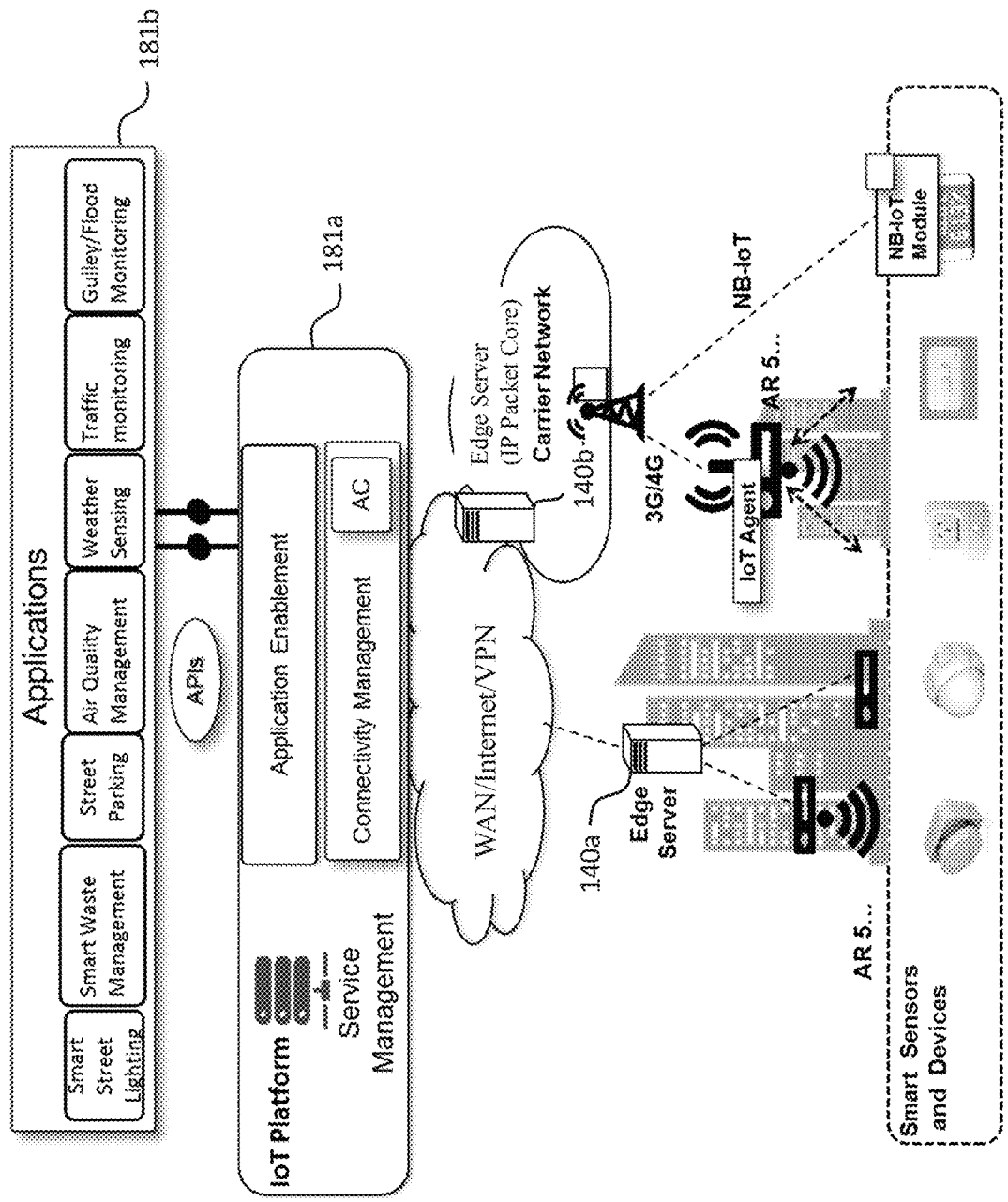
FIG. 7 shows a schematic diagram illustrating different aspects of a communication network and an edge server according to an embodiment.

FIG. 7 shows an embodiment of the edge servers 140a and 140b implemented in a smart city environment comprising wired and wireless local area networks. In this embodiment the edge servers 104a and 140b are configured to control and unify the communication between a plurality of smart city sensors and devices and their applications. In an embodiment the edge servers 140a and 140b can provide for the following functionalities and/or advantages within smart city verticals: traffic optimization, cost savings, edge data computing, gateway area/zone managements. In an embodiment, the edge servers 140a and 140b are configured to provide respective edge firewalls for defining GWs Areas/Zones DMZ (demilitarized zone).

Figure 8:
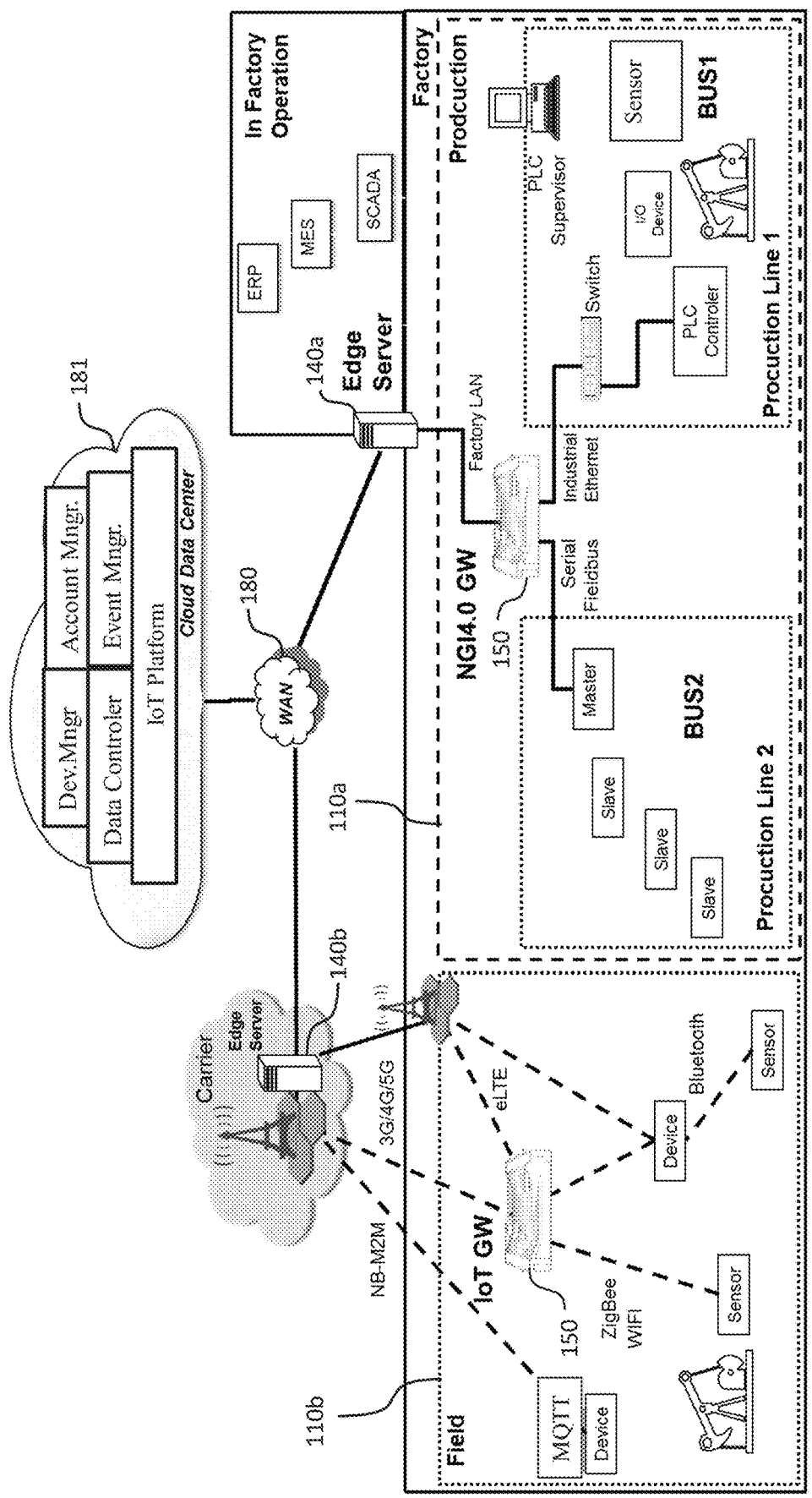
FIG. 8 shows a schematic diagram illustrating different aspects of a communication network and an edge server according to an embodiment.

FIG. 8 shows an embodiment of the edge servers 140a and 140b implemented in a scenario, where the first local area network 110a is a LAN within a factory comprising a first and a second production line and wherein the second local area network 110b is a LAN in the field supported by mobile communications network. Thus, the edge server 140a shown in FIG. 8 can be used at the edge of the factory LAN 110a as a single point of communication with other factories, material providers, logistic services, other IoT Verticals as well as smart devices, such as sensors, operating in the field.

Figure 9:
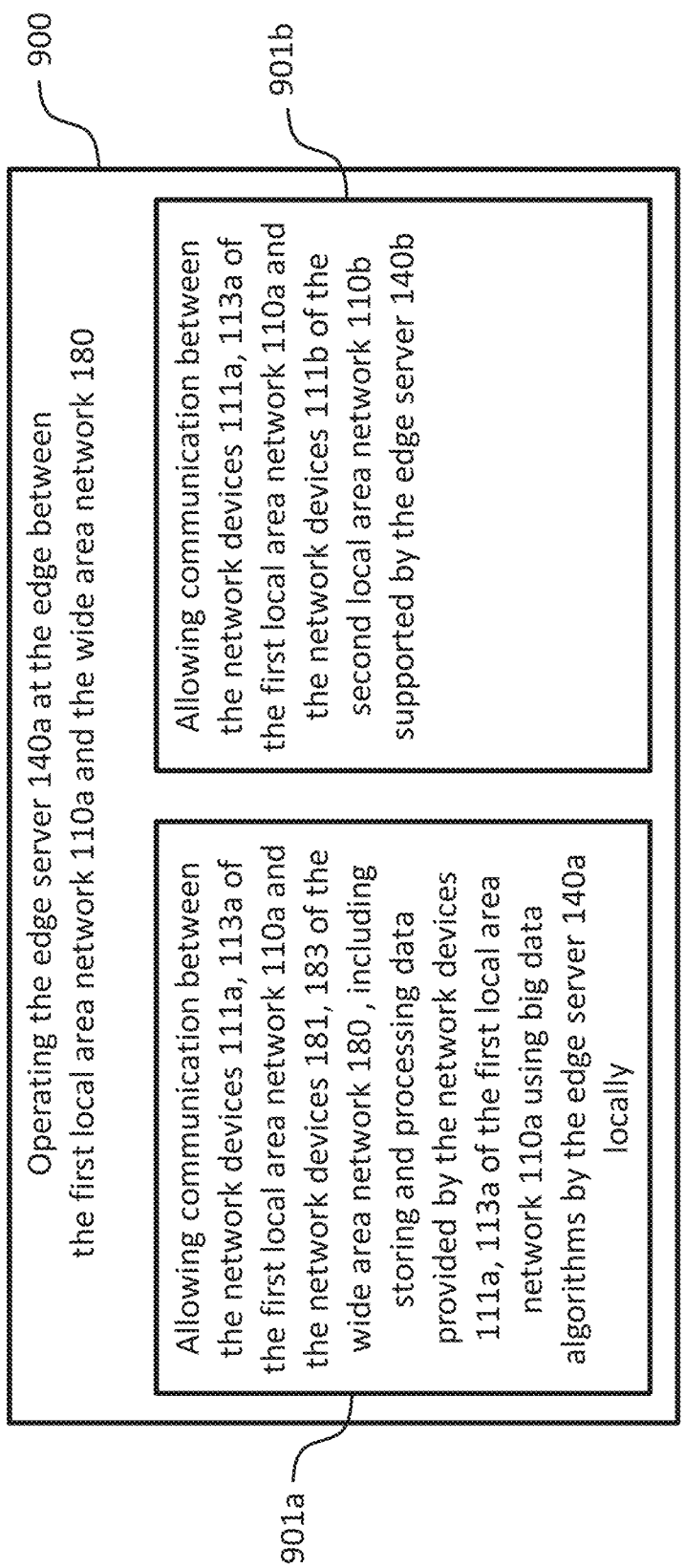
FIG. 9 shows a schematic diagram illustrating the steps of a method for operating an edge server according to an embodiment.

FIG. 9 shows a schematic diagram illustrating steps of a method 900 of operating the edge server 140a according to an embodiment. The method 900 comprises a step 901a of allowing communication between the network devices 111a, 113a connected to the first local area network 110a and the network devices 181, 183 connected to the wide area network 180 including storing and processing data provided by the network devices 111a, 113a of the first local area network 110a using big data algorithms by the edge server 140a locally. The method 900 comprises a further step 901b of allowing communication between the network devices 111a, 113a connected to the first local area network 110a and the network devices 111b connected to the second local area network 110b supported by the edge server 140b, wherein the edge server 140b is arranged at the edge between the second local area network 110b and the wide area network 180.

Embodiments of the invention can provide for the following advantages.

The edge server 140a can reduce the high costs of backhaul bandwidth. Currently using a cloud only based approach works well for single sensor systems in multiple different locations, where there are low data rates and where there are existing communication capabilities. However, where higher data rates are required e.g. video streaming, it is not efficient or cost effective to directly backhaul from either the network devices or from the gateways. The edge server 140a can act as an additional aggregation point to collect data traffic. One study has shown that IoT traffic, which may have to be transported long distance nationally or internationally, can be reduced by 95% by using the edge server 140a, which will lead to much reduced costs. The longer the distance back to the cloud, the greater are the cost savings.

The edge server 140*a* can give higher availability and add more resilience to Industrial and IoT local area networks: In the event of a communications outage towards the cloud the edge server 140*a* can work autonomously, as required to perform local data processing and automation of the networks. The edge server 140*a* can act as data backup to another in case of failure.

The edge server 140*a* has the capability to do a lot of the data processing and analytics locally that is conventionally done back in the cloud. However, this current approach can result in too high latency, which will not be suitable for some latency sensitive applications, where quick response times and decisions need to be made in real time. Devices and sensors will be able to interact locally and exchange information to enable smarter applications and services.

With the edge server 140*a* policies, configurations and parameters can be tested, controlled and adjusted on a more local level. Gateways can be setup and controlled in a more agile manner using Software Defined Networks (SDN) technology utilized by the edge server 140*a*. The edge server 140*a* can manage gateways through southbound interfaces, deliver applications and VMs to gateways, and obtain information about the gateways and attached network devices.

The edge server 140*a* can also provide interfaces to multiple clouds that will enable new possibilities for interaction with applications/data stored in other clouds.

The edge server 140*a* can provide industrial interlinking, promote protocol interoperability, act as a secure gatekeeper, perform real-time edge data analytics and processing.

The advantages for managing, for instance, smart sensors using the edge server 140*a* in combination with cloud technologies are the following: a unified communication, as the edge server 140*a* acts as a gate keeper and is the only way that the smart sensor data can pass to higher applications that reside in the cloud; much lower bandwidth requirements; significantly lower overall costs; greater availability from local automation and local autonomy; better advanced real-time functionality from integration of local sensors and smart sensors; easier communication with multiple clouds (e.g., comparison of interfaces using a different Software as a Services (SaaS) cloud(s)); ability to use a lower-cost consumer commodity ecosystem with sensors based on current consumer mobile management of sensors; earlier adoption of new sensors from the consumer mobile commodity ecosystem; earlier adoption of new sensors with much higher data rates; less complex and real-time local management of sensors (resetting, managing drift, etc.); less complex ability to test and manage local sensors; higher IoT functionality based on lower latencies; managing the role and policies for a sensors or smart sensors; using the latest traffic engineering technology such as Software Defined Networking (SDN) to utilize the maximum benefits of SDN technology, by centrally configuring and managing all Internet of Things (IoT) Gateways (GW's) that are connected to the edge server 140*a*.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An edge server arranged at the edge between a first local area network and a wide area network, wherein the edge server comprises:
   a communicator configured to facilitate communication between the first local area network and the wide area network, wherein the communicator is further configured to store and process data provided by the first local area network using big data algorithms locally;
   an interlinker configured to interact with a corresponding interlinker supported by another edge server arranged at the edge between a second local area network and the wide area network to facilitate communications between the first local area network and the second area network, wherein the interaction by the interlinker with the corresponding interlinker comprising allowing secure communication between the first local area network and the second local area network; and
   a software defined networking (SDN) controller configured to:
      provide SDN functions to the first local area network; and
      manage at least one gateway of the first local area network in case the at least one gateway cannot be controlled by an SDN controller of the wide area network.

2. The edge server of claim 1, wherein the communicator is further configured to forward request information from gateway and smart device in the first local network to a cloud-based gateway in the wide area network.

3. The edge server of claim 2, wherein the communicator is configured to forward the request information to the cloud-based gateway on the basis of Advanced Message Queuing Protocol (AMQP) and/or Message Queuing Telemetry Transport (MQTT) protocols.

4. The edge server of claim 1, wherein the interlinker is configured to allow secure communication between the first local area network and the second local area network.

5. The edge server of claim 1, wherein the edge server further comprises a network functions virtualizer configured to provide virtualized network functions to the first local area network.

6. The edge server of claim 5, wherein the network functions virtualizer is configured to provide virtualized network functions in response to the triggering of a one-click service creation function provided by a graphical user interface.

7. The edge server of claim 1, wherein the SDN controller is configured to manage at least one gateway of the first local area network.

8. The edge server of claim 7, wherein the SDN controller is configured to manage the at least one gateway of the first local area network in case the at least one gateway cannot be controlled by a SDN controller of the wide area network.

9. The edge server of claim 1, wherein the edge server is configured to communicate with the first local area network via a gateway.

10. The edge server of claim 9, wherein the gateway is an OPC-UA, open platform communications—unified architecture, compliant gateway.

11. The edge server of claim 1, wherein the edge server is configured to provide a graphical user interface for allowing a user to interact with the edge server.

12. A method of operating an edge server at the edge between a first local area network and a wide area network, wherein the method comprises:

facilitating, at the edge server, communication between the first local area network and the wide area network;

storing and processing, at the edge server, data provided by the first local area network using big data algorithms by the edge server to improve response times in the communication between the first local area network and big data applications of the wide area network; and interacting, at the edge server, with a corresponding interlinker supported by another edge server arranged at the edge between a second local area network and the wide area network to facilitate communication between the first local area network and the second local area network, wherein the interaction with the corresponding interlinker comprising allowing secure communication between the first local area network and the second local area network;

providing software defined network functions to the first local area network; and managing at least one gateway of the first local area network in case the at least one gateway cannot be controlled by a SDN controller of the wide area network.

13. A non-transitory computer program comprising program code for performing the method of claim 12 when executed on a computer.

14. A network, comprising
at least two local area networks,
a wide area network; and
an edge server of claim 1 arranged at the edge of each one of the at least two local area networks and the wide area network.

* * * * *